United States Patent [19]

Van der Plaats

[11] 3,810,032

[45] May 7, 1974

[54] AMPLIFIER DEVICE WITH REMOTE POWER SUPPLY

[75] Inventor: Petrie Johan Van der Plaats, Hilversum, Netherlands

[73] Assignee: U. S. Philips Corporation, New York, N.Y.

[22] Filed: Nov. 7, 1972

[21] Appl. No.: 304,390

[30] Foreign Application Priority Data

Nov. 19, 1971 Netherlands .......................... 7115947

[52] U.S. Cl. ............... 330/29, 330/30 D, 330/38 M

[51] Int. Cl. .............................................. H03g 3/30

[58] Field of Search ........... 330/22, 29, 30 D, 38 M, 330/40

[56] References Cited

UNITED STATES PATENTS

| | | | |
|---|---|---|---|
| 3,731,215 | 5/1973 | Peil et al. | 330/145 X |
| 3,491,307 | 1/1970 | Solomon et al. | 330/30 D |

*Primary Examiner*—Herman Karl Saalbach
*Assistant Examiner*—James B. Mullins
*Attorney, Agent, or Firm*—Frank R. Trifari; Henry I. Steckler

[57] ABSTRACT

Am amplifier device with remote power supply via a transmission line via which an alternating current signal is transmitted simultaneously with the supply current (from or to the amplifier device). A damping control unit damps the alternating current signal such that the damping differences between long and short transmission lines are equalized. To this end the amplifier device comprises a reference current source, the current of which is independent of variations in the supply voltage. Furthermore, means are provided for generating a control current which is equal to the difference between a constant current which is derived from the current source and a current which is linearly dependent of the supply current. This control current controls a controlled amplifier, the amplification of which is a monotonously decreasing function of the supply current.

5 Claims, 2 Drawing Figures

AMPLIFIER DEVICE WITH REMOTE POWER SUPPLY

The invention relates to an amplifier device with remote power supply via a transmission line via which an alternating current signal is transmitted, simultaneously with the supply current, from or to the amplifier device, said amplifier device comprising a damping control unit for damping the alternating current signal in accordance with the length of the transmission line so that the differences in alternating current damping of transmission lines of different length are equalized.

The sensitivity of a telephone connection is determined inter alia by the sensitivity of the microphone and telephone capsules used in the subscriber sets and by the length and the damping of the subscriber lines. The aim is to render the sensitivity of a telephone connection independent of the length of the subscriber lines. By utilizing microphone signal amplifiers and/or telephone signal amplifiers, the damping of long subscriber lines or of subscriber lines having a high damping (small core diameter) can be compensated for. If the loudness of a telephone connection between two subscriber sets having long subscriber lines has the maximum permissible value, the loudness will be too high for short subscriber lines. So as to eliminate this drawback, damping control is used to damp the speech signals more in the case of short subscriber lines than in the case of long subscriber lines.

In known damping control systems use is made of non-linear elements such as voltage-dependent resistors which are connected parallel to the microphone signal circuit and/or the telephone signal circuit. These non-linear elements are controlled by a control voltage which is generated across a resistor by the supply current (or part thereof). However, the damping characteristic of such elements is poorly reproducible, the control range is comparatively small, a control characteristic which varies in the same manner (linearly) as a function of the supply current as the damping of the subscriber line is difficult to realize, and the non-linear elements introduce non-linear distortion of the speech signals.

The invention has for its object to provide a novel concept of the amplifier device of the kind set forth which can be readily realized in integrated-circuit form, in which the drawbacks and shortcomings of the known damping control systems are eliminated, and by means of which notably the variation of the damping of the subscriber line as a function of its length can be accurately equalized. Such an accurate equalization means that the sensitivity of the telephone connection is constant (within the control range).

The amplifier device according to the invention is characterized in that the amplifier device comprises a reference current source, the current of which is independent of variations in the supply voltage, means being provided for generating a control current which is equal to the difference between a constant current which is derived from the reference current source and a current which is linearly dependent of the supply current, an amplifier stage being provided which is controlled by the control current and whose amplification within the control range is a monotonically decreasing function of the supply current.

The invention will be described in more detail with reference to the figures. Therein:

FIG. 1 shows the circuit diagram of a microphone signal amplifier and a telephone signal amplifier which are connected to a subscriber line of a telephone system. The two conductors of the subscriber line are denoted by *a* and *b*.

Figure 1:
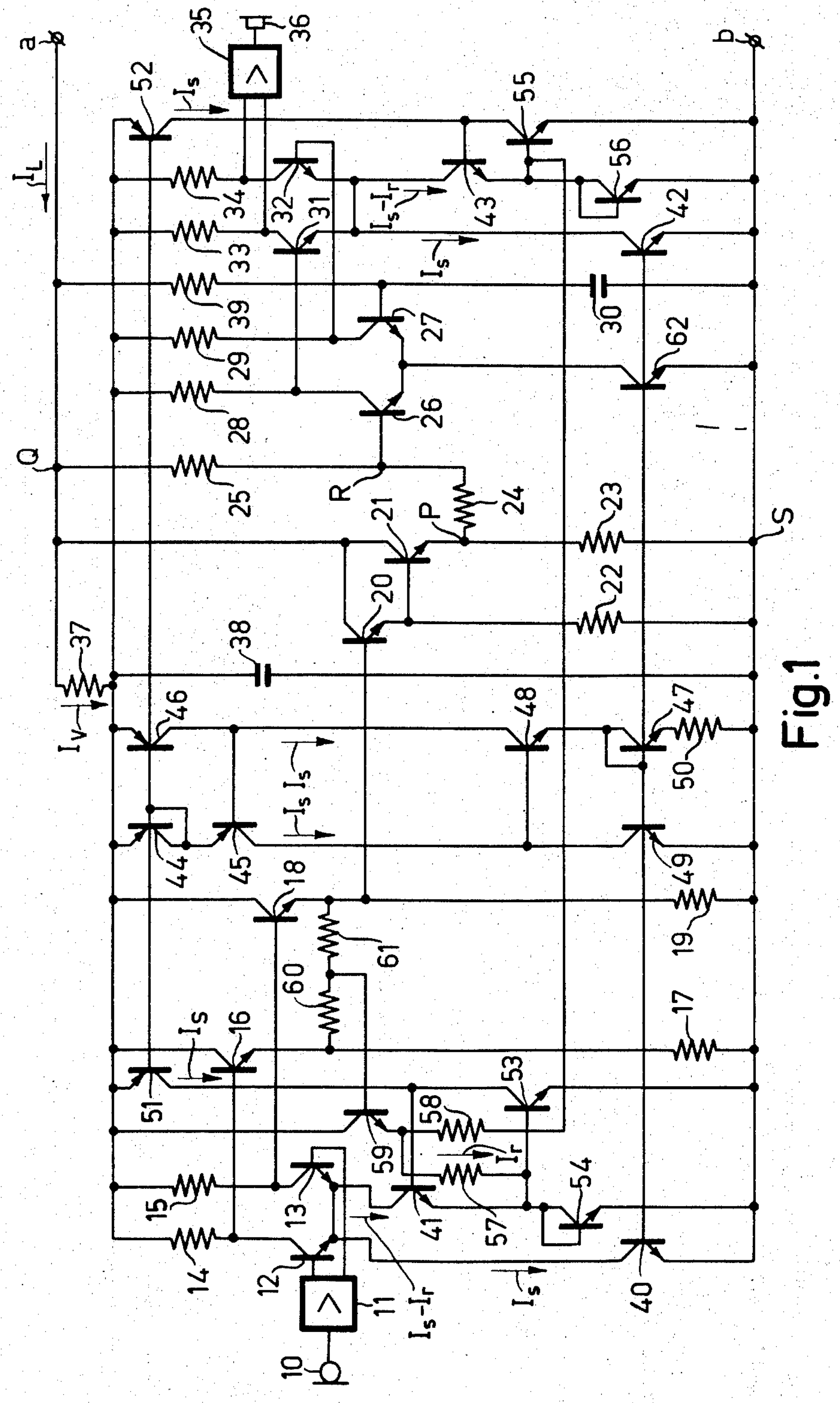
FIG. 1 shows the diagram of a microphone signal amplifier and a telephone signal amplifier according to the invention.

The device shown in FIG. 1 consists of various functional units, each of which consists of various components. These functional units are denoted by functional references. (The components of a functional unit are sequentially numbered. A functional unit is identified by statement of the lowest and the highest reference number which is used for denoting a component; the two numbers are separated by a horizontal stroke).

The signal of microphone 10 is applied, via a preampflier 11 (provided with balanced outputs), to the inputs of a difference-voltage control amplifier 12–15. Connected to the outputs of difference-voltage control-amplifier 12–15 are the voltage-followers 16–17 and 18–19. The output of voltage-follower 18–19 is connected to the input of an output amplifier 20–22. The collector-emitter path of the transistor 21 is connected parallel to the diagonal P-Q of bridge circuit 23–25. The branch Q-S of the bridge circuit is formed by the input impedance of the subscriber line.

The telephone signal amplifier comprises a difference-voltage preamplifier 26–29. One input of this amplifier is connected to point R of the bridge circuit 23–25; the other input is connected, via a capacitor 30, to the conductor *b* of the subscriber line. This capacitor has a low impedance for speech currents. The speech voltage which is received from the subscriber line is then present, via resistor 25, between the inputs of difference-voltage preamplifier 26–29. Instead of capacitor 30, other circuit elements can be used such as, for example, a Zener diode or a series connection of a plurality of diodes. These elements can be more readily integrated than a capacitor. The impedance (for speech currents) of these elements is also low, whilst these elements cause a shift of the direct voltage level such as is required for the direct voltage setting of difference-voltage preamplifier 26–29.

If the bridge circuit 23–25 is in the balanced state and the microphone 10 is spoken into, no speech voltage is produced across the diagonal R-S; in this case no speech voltage is supplied to the difference-voltage preamplifier 26–29.

The outputs of difference-voltage preamplifier 26–29 are connected to the inputs of a different voltage control amplifier 31–34, the outputs of which are connected to the inputs of a difference-voltage output amplifier 35. The telephone 36 is connected to the output of the latter amplifier.

The supply current for all amplifiers with the exception of output amplifier 20–22 is derived, via the smoothing network 37–38, from the voltage between the conductors *a* and *b*. The base-bias current for transistor 26 of difference-voltage preamplifier 26–29 is derived from conductor a via resistor 25. The corresponding bias current for transistor 27 is derived from the conductor *a* via resistor 39.

During a telephone call the subscriber line is connected on the far end to a direct voltage supply bridge which is connected, via a pair of supply resistors, to the central battery. The supply current which flows through the subscriber line is dependent of the supply resistors, the loop resistance of the subscriber line, the resistance of the subscriber set and the battery voltage. In short subscriber lines a large supply current flows, and a small supply current flows in long subscriber lines. In practice the supply current of conventional subscriber sets lies between approximately 50 mA for short subscriber lines and approximately 15 mA for long subscriber lines.

The subscriber line damps the speech signals as a function of the length of line. This damping amounts to approximately 1 dB for each increase of the loop resistance by 140 Ohms for a subscriber line having a core diameter of 0.5 mm. If the loudness of a telephone connection between subscriber sets having long subscriber lines has a given maximum permissible value, the loudness will be too high for short subscriber lines. So as to avoid this drawback, the damping of the subscriber set is automatically controlled. This damping control functions such that the sensitivity of the subscriber set is not influenced in the case of long subscriber lines, and is reduced in the case of short subscriber lines. With a control range of, for example, 6 dB, the damping diferenves between subscriber lines having a difference in loop resistance of approximately 840 Ohms can be equalized.

Figure 2:
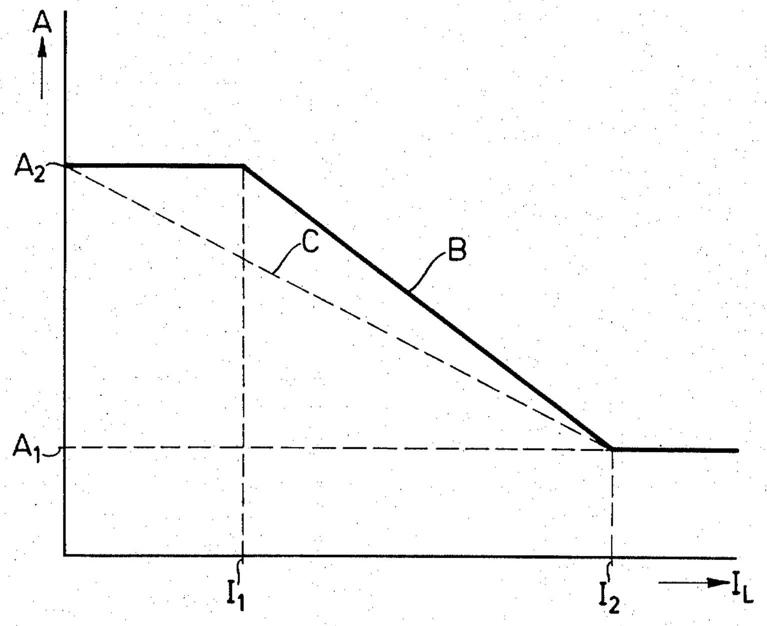
FIG. 2 shows a number of control characteristics.

In the device shown in FIG. 1 the damping is controlled by controlling the amplification of difference voltage control amplifier 12–15 as far as the microphone signal is concerned, and by controlling the amplification of difference-voltage control amplifier 31–34 as far as the telephone signal is concerned. These amplifiers are controlled such that the amplification (in the control range) is a monotonously decreasing function of the supply current. In FIG. 2 the relation between the amplification A and the supply current $I_L$ is illustrated (characteristic B). $I_1$ and $I_2$ denote the limits of the control range. $A_1$ and $A_2$ are the values of the amplification at the control range limits. For current values smaller than $I_1$, A is constant and equal to $A_2$. For current values exceeding $I_2$, A is constant and equal to $A_1$. In the control range:

$$A = A_2 \; c \; (I_L - I_1) \tag{1}$$

, in which *c* is a constant which is given by:

$$c = (A_2 - A_1)/(I_2 - I_1) \tag{2}$$

The control range amounts to 20 log $A_s/A_1$ dB. In the case of a control range of 6 dB, the damping differences between subscruber lines having a difference in loop resistance of approximately 840 Ohms can be equalized. If, for example, $I_2$ corresponds to the current value at a loop resistance of zero Ohms and the control range amounts to 6 dB, $I_1$ corresponds to the current value at a loop resistance of 840 Ohms.

The difference-voltage control amplifier 12–15 is supplied with a constant current $I_s$ by transistor 40, and receives a control current $I_s$ - $I_r$ from transistor 41. Therein, $I_r$ is a current which is proportional to the supply current $I_L$. The direction current which flows through each of the transistors 12 and 13 is then:

$$(I_s + I_s - I_r)/2 = I_s - I_r/2 \tag{3}$$

The small-signal voltage amplification of transistor 13 is given by (approximately):

$$A = r_c/r_E \tag{4}$$

in which $r_c$ is the value of resistor 15 and in which:

$$r_E = kT/qI_E = U_T/I_E \tag{5}$$

so that:

$$A = r_c \cdot I_E/U_T \tag{6}$$

in which $I_E$ represents the value of the emitter direct current.

The following relation is obtained from (3) and (6):

$$A = r_c \cdot (I_s - I_r/2)/U_T \tag{7}$$

The relation (7) shows that the amplification of difference-voltage control amplifier 12–15 is a motonically (linearly) decreasing function of the supply current. The amplification is maximum if $I_r = 0$:

$$A_{max} = r_c \cdot I_s/U_T \tag{8}$$

The maximum value of $I_r$ is $I_s$, so:

$$A_{min} = r_c \cdot I_x/2U_T \tag{9}$$

The control range has a value 20 log $A_{max}/A_{min}$ dB = 6 dB.

The control characteristic varies in accordance with FIG. 2 (characteristic C). It being assumed that $A_{max} = A_2$ and $A_{min} = A_1$, and that $I_r$ is proportional to $I_L$. If the current supplied by transistor 40 is chosen to be smaller than $I_S$, the control range becomes larger than 6 dB. In the case of characteristic B the control range has the value $I_L = 0$ as its lower limit (according to theory). In practice this limit is not reached because the circuit requires a given supply current for amplification of alternating current signals which deviate from zero. A lower limit $I_L = I_1$ which deviates from the value $I_L = 0$ can be obtained by making the current $I_r$ proportional to the difference between the supply current $I_L$ and a constant current. If this constant current has the value $I_1$, the characteristic B is obtained.

The amplification of difference-voltage control amplifier 31–34 is controlled in the same manner. The transistor 42 supplies the amplifier with a constant current $I_s$; the transistor 43 supplies the amplifier with the control current $I_s$ - $I_r$.

The constant current $I_s$ is derived from a reference current source 44–50, the current of which is independent of variations in the supply voltage. A current source of this type is described in "Philips Technisch Tijdschrift," Vol. No. 1, 1971, pp. 1–12. The reference current source consists of two controlled current sources, one current source comprising the *pnp*-transistors 44–46 and one current source comprising the *npn*-transistors 47–49. The two current sources are connected such that the output current of the one source is the reference current of the other source and vice versa. The current $I_s$ is given by the relation:

$$I_s R = U_T \ln p \quad (10),$$

in which R represents the value of resistor 50 and $p$ ($p > 1$) is the ratio of the emitter surface of the transistor o7 and the emitter surface of transistor 49. Via the transistors 40, 42, 51, 52 and 62, the constant current $I_s$ is available to the other circuits. Two of these circuits, i.e., the difference-voltage control amplifiers 12–15 and 31–34 which are supplied by the transistors 40 and 41, have already been described. Transistor 62 supplies difference-voltage preamplifier 26–29 with the constant current $I_s$.

Transistor 51 supplies the reference current $I_s$ to a controlled current source 41, 53–54 which is used to supply the difference voltage control amplifier 12–15 with the current $I_s - I_r$. Transistor 52 supplies the reference current $I_s$ to the controlled current source 43, 55–56 which has the same function for difference-voltage control amplifier 31–34.

The controlled current source 41, 53–54 is of the type described in the above-mentioned publication. The base-emitter voltage $V_{BE}$ of transistor 54, connected as a diode, is (under all circumstances) equal to the base-emitter voltage of transistor 53. The collector currents will then be equal, assuming that the two transistors have the same emitter surface and hence the same leakage currents $I_{co}$. (Hereinafter the base currents are ignored and it is assumed that all transistors have the same base-emitter voltage $V_{BE}$ which amounts to approximately 0.6 volts for Si transistors. This sufficiently approximates reality to obtain a representative idea of the operation). Via resistor 57, the current $I_r$ is supplied to transistor 54. (Via resistor 58 the current $I_r$ is supplied to transistor 56 of the other controlled current source). The current which flows through transistor 54 is the sum of the current $I_r$ and the current which flows through transistor 41, and this sum is equal to the collector of transistor 53. The latter is equal to the constant current $I_s$ which is supplied by transistor 51. As a result, the current which flows through transistor 41 is equal to $I_s - I_r$. (It can be demonstrated in the same manner that the collector current of transistor 43 of the other controlled current source is equal to $I_s - I_r$).

The current $I_r$ is proportional to the supply current which flows through the subscriber line. This current is derived as follows. The emitters of the transistors 16 and 18 are connected via the series connection of the identical resistors 60 and 61. The junction of the resistors 60 and 61 is connected to the base of a transistor 59, the emitter of which is connected to the resistors 57 and 58. The variations of the emitter voltage of transistor 16 are in phase-opposition with the variations of the emitter voltage of transistor 18, so that the voltage on the junction of the resistors 60 and 61 does not vary. This junction has a voltage which is $2V_{BE}$ (transistors 20 and 21) higher than the emitter voltage of transistor 21. The voltage which is generated by the current $I_r$ across resistor 57 is $2V_{BE}$ (transistors 59 and 53) lower than the voltage of the junction of the resistors 60 and 61. The voltage which is generated by the current $I_r$ across resistor 57 is then equal to the voltage which is generated by the emitter current of transistor 21 across resistor 23. The latter current is equal to the difference between the supply current $I_L$ (flowing through the subscriber line) and the supply current $I_V$ which flows through resistor 37. The following relation exists between $I_r$, $I_L$ and $I_V$:

$$I_r \cdot R_{57} = (I_L - I_V) \cdot R_{23} \quad (11),$$

in which $R_{57}$ and $R_{23}$ are the values of the resistors 57 and 23.

By substitution of the relation (11) in the relation (7), and by giving the relation thus obtained the form of relation (1), the following is obtained:

$$\left.\begin{array}{c} A_2 = r_c \cdot I_s/U_T \\ c = r_c \cdot R_{23}/2 \cdot R_{57} \cdot U_T \\ I_1 = I_V \end{array}\right\} \quad (12)$$

The current $I_V$ is substantially constant, so that the control characteristic B, where $I_1 = I_V$, is obtained.

In a practical embodiment the current $I_V$ has a value of 800–900 $\mu$A, as opposed to $I_L$ which has a value of 15–50 mA, so it is substantially negligible. It follows from relation (11) that $I_r$ is substantially proportional to $I_L$, the proportionality factor being determined by the choice of $R_{57}$ with respect to $R_{23}$. The control characteristic C having a lower limit $I_L = 0$ is then obtained (according to theory).

For values $I_1$ which are so small that the circuit does not function with a supply current $I_L = I_1$, only a theoretical difference exists between the characteristics B and C. However, if such a setting of $I_1$ is desired that the amplification is constant for a long subscriber lines, it is sufficient to subtract a constant current from the current $I_r$ (which is given by the relation (11)). This can be realized in a manner which is analogous to the manner in which the current $I_r$ is subtracted from the current $I_s$ in the circuit shown in FIG. 1.

What is claimed is:

1. A circuit for operation from a transmission line having signal and power supply currents thereon, said circuit comprising means for generating a constant current independent of variations in the supply current, means for deriving a current that is linearly dependent upon the supply current, means coupled to said generating and deriving means for supplying a control current in accordance with the difference between said constant current and said linearly dependent current, and means for equalizing the effects of changes in the line length upon said signal comprising an amplifier coupled to receive said signal and having a gain control input means coupled to said supplying means for monotonically decreasing the amplification as a function of the supply current.

2. A circuit as claimed in claim 1 wherein said amplifier comprises two transistors having a common emitter connection, and means for supplying the sum of a constant current from the generating means and the control current to the common emitter connection.

3. A circuit as claimed in claim 1, wherein said means for supplying the control current comprises a current source means for supplying an output current controlled by the generating means and means for subtracting a current which is linearly dependent upon the supply current from the output current supplied by the controlled current source.

4. A circuit as claimed in claim 3 further comprising a reference voltage diode coupled to said current source means and to said deriving means.

5. A method for equalizing the effects of transmission line length variations upon a signal comprising generating a constant current independent of variations in a supply current in the transmission line, deriving a current linearly dependent upon the supply current, supplying a control current in accordance with the different between said constant and linearly dependent currents, amplifying said signal in accordance with said control current, and monotonically decreasing the amplification of said signal in accordance with said supply current.

* * * * *